United States Patent [19]
Wagstaff et al.

[11] Patent Number: 5,732,045
[45] Date of Patent: Mar. 24, 1998

[54] FLUCTUATIONS BASED DIGITAL SIGNAL PROCESSOR INCLUDING PHASE VARIATIONS

[75] Inventors: Ronald A. Wagstaff; Jacob George, both of Slidell, La.

[73] Assignee: The United States of America as represented by the Secretary of the Navy, Washington, D.C.

[21] Appl. No.: 787,001

[22] Filed: Dec. 31, 1996

[51] Int. Cl.$^6$ .................................................. H04B 1/06
[52] U.S. Cl. .............................. 367/135; 367/901; 367/98
[58] Field of Search ............................... 367/98, 135, 136, 367/901; 364/724.01, 724.18

[56] References Cited

U.S. PATENT DOCUMENTS 4,648,057  3/1987  Wagstaff et al. ..................... 364/726

OTHER PUBLICATIONS

R.A. Wagstaff et al., Phase Variations in a Fluctuation Based Processor, SPIE vol. 2751, at p. 132 (proceedings of Conference held Apr. 8, 1996).

*Primary Examiner*—Daniel T. Pihulic
*Attorney, Agent, or Firm*—Thomas E. McDonnell; Edward F. Miles

[57] ABSTRACT

A scheme for filtering noise from a signal, in which the noise fluctuates significantly in phase. The signal is sampled to produce N members of a time series and the phase of each signal extracted in the form of a magnitude and a phaser, i.e. for a time series $|x_1|e^{i\theta}{}_1, |x_2|e^{i\theta}{}_2, \ldots, |x_N|e^{i\theta}{}_N$, where $|x_n|$ is the magnitude of the nth member of the N time samples, and $e^{i\theta}{}_N$ the phaser for the nth sample. The phasers are added to form a complex value s such that $$\bar{s} = \Sigma_{N=1}{}^N [Re(e^{i\theta_n}) + iIm(e^{i\theta_n})].$$

Phase noise which fluctuates strongly will tend cancel itself in the sum s, whereas phase resulting from a stable signal will tend to reinforce. Thus the scalar |s̄| will be relatively large in the presence of stable tonals, and small in the presence of noise alone, making it an effective signal filter.

10 Claims, 4 Drawing Sheets

5,732,045

FLUCTUATIONS BASED DIGITAL SIGNAL PROCESSOR INCLUDING PHASE VARIATIONS

BACKGROUND

Detection of underwater signals is complicated by the presence of ambient noise and fluctuations of the signal itself. But in cases where the signal fluctuates less than the noise, it is possible to utilize the different magnitudes of fluctuations of signal and noise to improve the detection. An example of such a processor is the WISPR filter disclosed in application Ser. No. 07/772,275 filed Sep. 30, 1991, and the AWSUM filter disclosed in application Ser. No. 08/314,281, filed Sep. 30, 1994, both by Wagstaff as sole inventor, and both currently pending. The AWSUM filter, and its special case the WISPR filter, use various types of averages of power values to produce a filtered signal. For example, the power values could be the squares of absolute magnitudes of complex pressures for a given frequency bin, calculated, e.g., by a Fast Fourier Transform from a time series of hydrophone voltages. The phase information in the complex pressures are ignored in AWSUM, and other available filters, thus wasting information which might be used to improve filter performance.

SUMMARY OF THE INVENTION

Accordingly, an object of the invention is to exploit phase information in a complex time series to filter noise in a novel manner from the signal which produced the time series.

Another object of the invention is to exploit phase information in a manner which is useable with existing filters, such as AWSUM and WISPR, to further improve their performance.

In accordance with these, and other objects made apparent hereinafter, the invention concerns a method and apparatus which filters an N point time series sampling of a signal propagating in a physical medium, the nth member of the time series being denoted $x_n$, $n=1, 2, \ldots, N$. The phase $\theta_n$ is determined for each of the samples and a sum $\bar{s} = \sum_{n=1}^{N} e^{i\theta_n} = \sum_{n=1}^{N} [Re(e^{i\theta_n}) + iIm(e^{i\theta_n})]$ is formed from the phasers of the N time samples. Phase noise in $\theta_n$ will add incoherently, whereas the phase of steady signals will be relatively stable among the samples and will add coherently. In this manner, $|\bar{s}|$ will be relatively large if the signal contains only stable tonals, but relatively low if the signal contains only noise, thus, $|\bar{s}|$ acting as an effective noise filter.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 2 shows unfiltered signal power.

FIG. 3 shows attenuation by the combined action of a known filter and an embodiment of the invention.

FIG. 4 shows attenuation due to the known filter alone.

FIG. 5 shows the resultant signal after filtering by the combination filter.

FIG. 6 shows the resultant signal after filtering by the known filter alone.

DETAILED DESCRIPTION

Figure 1:
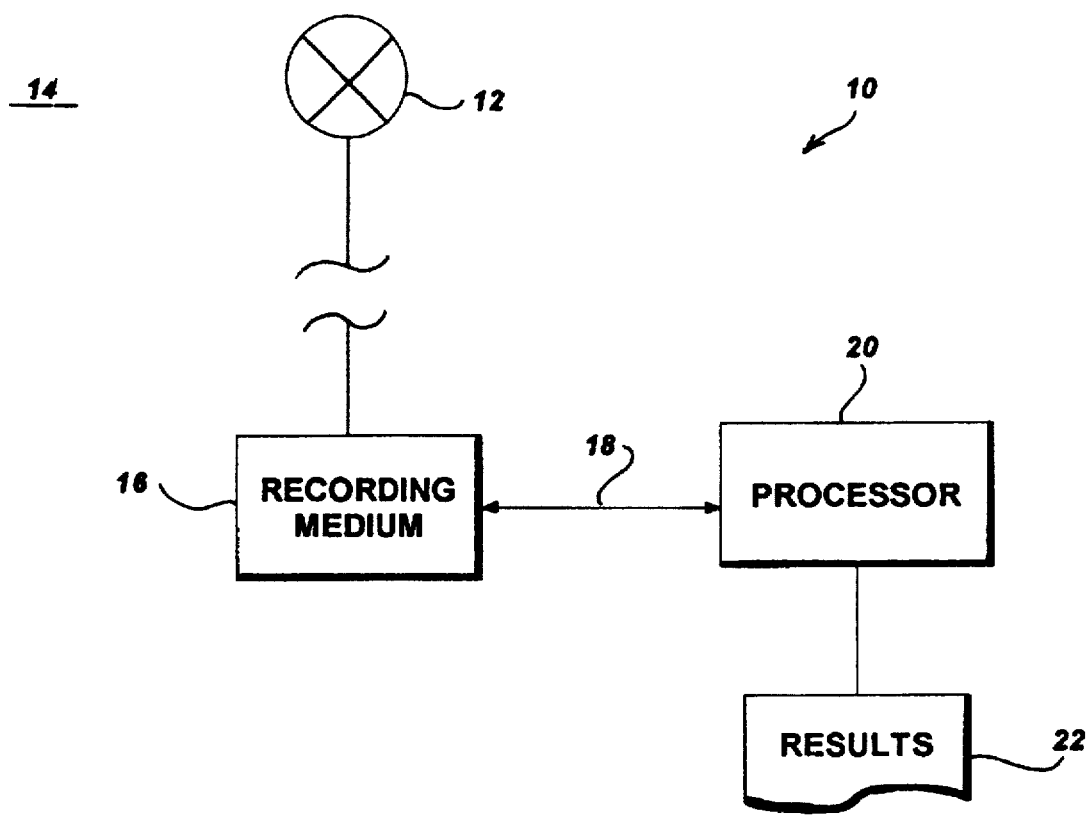
FIG. 1 is a schematic of apparatus for practicing an embodiment of the invention.

With respect to the drawing figures, and with particular reference to FIG. 1, an apparatus useful for practicing the invention is shown schematically. A sensor 12 is disposed in a medium 14 which can support wave propagation. This means, essentially, virtually any linear medium, examples of which are media which can support acoustic waves, electromagnetic waves, etc. Output of sensor 12 is sampled N times to produce a time series $x_1, x_2, \ldots, x_N$, in which the nth term is designated $x_n$, $n=1, 2, \ldots, N$. All $x_n$ are complex numbers, such as one would get by sampling the output of an acoustic hydrophone, electromagnetic voltage sensor, etc. Recording medium 16, such as digital computer memory, records the samples, and the samples are fed via link 18 to processor 20, preferably a dedicated programmable microprocessor or computer. Because the series is complex, one can represent the series as $|x_1|e^{i\phi_1}, |x_2|e^{i\phi_2}, \ldots, |x_N|e^{i\phi_N}$, where $\phi_n = (n\omega\Delta t + \theta_n)$, $\omega$ is the angular frequency of the sampled signal, $\Delta t^{-1}$ is the sampling rate, $\theta_n$ is the phase of the nth sample, and $i=(-1)^{1/2}$. Processor 20 removes the steady increment in phase from one sample to the next by multiplying each nth term of the time series by the phaser $e^{-in\omega\Delta t}$, which yields a time series:

$$|x_1|e^{i\theta_1}, |x_2|e^{i\theta_2}, \ldots, |x_N|e^{i\theta_N}.$$

Thus expressed, each member of the series has a real amplitude $|x_n|$ multiplied by a phaser $e^{i\theta_n}$, the latter containing the phase information of the member.

Processor 20 then forms the sum $\bar{s}$ of all N of these phasers, in which $\bar{s}$ is given by:

$$\bar{s} = \sum_{n=1}^{N} e^{i\theta_n} = \sum_{n=1}^{N} [Re(e^{i\theta_n}) + iIm(e^{i\theta_n})].$$

If the signal in medium 14 is highly stable in phase, as one would expect for a signal unperturbed by noise, $\theta n$ will vary little, if at all, among the N members of the time series, and the magnitude of the sum $|\bar{s}|$ will be N, or near N, because the magnitude of any phaser is unity. In other words, the terms of the sum will add coherently. If, however, an otherwise stable signal is perturbed by large noise fluctuations in phase, the real and imaginary parts of $\theta_n$ will vary strongly, and, these variations being random or near random, will tend to self cancel in sum $\bar{s}$, and the magnitude $|\bar{s}|$ will be relatively small. If, the sampled signal contains similar noise plus a stable signal, the noise will self cancel in $\bar{s}$, whereas the stable signal will add coherently. In this manner, $\bar{s}$ constitutes a filter which disproportionately attenuates highly fluctuating signals (n.b. narrowband noise) compared to stable signals. In practice, it is preferred to use the average value $|\bar{s}|' = |\bar{s}|/N$. This is so because, in the absence of noise, $|\bar{s}|=1$, and thus the filtered signal has the same units as the unfiltered signal.

As discussed above, processor 20 must remove the phase information in the phaser $e^{i\omega\Delta t}$ which is solely an artefact of the sampling rate $\Delta t^-$. This is done by multiplying each nth member of the time series by $e^{-in\omega\Delta t}$. It is frequently difficult to determine $\omega\Delta t$ a priori with desired accuracy, especially in the presence of phase noise. Thus it is preferred that processor 20 determine $\omega\Delta t$ experimentally. If one treats the phaser $e^{i\phi_n} = Cos(\phi_n) + iSin(\phi_n)$ as a vector with orthogonal components ($Cos(\phi_n)$, $Sin(\phi_n)$), from elementary vector algebra the phase difference $\Delta\phi_{n,n+1}$ between the nth and (n+1)th members of the time series is given by:

$$Cos(\Delta\phi_{n,n+1}) = Cos(\phi_n) COS(\phi_{n+1}) + Sin(\phi_n) Sin(\phi_{n+1})$$

from which processor 20 can readily determine $\Delta\phi_{n,n+1}$ for n=1, 2, ..., N-1. For a steady signal in the absence of noise, $\phi_n$ would be constant and $\Delta\phi_{n,n+1}$ would be zero for all n. In the presence of phase noise, the best estimate of the value $\phi_n$ over the whole time series is one which globally minimizes all the $\Delta\phi_{n,n+1}$'s. One such measure is $\alpha = \Sigma_{n=1}^{N-1} Sin^2(\Delta\phi_{n,n+1}) = [1 - Cos^2(\Delta\phi_{n,n+1})]$. For no phase difference among any members of the time series, i.e. $\Delta\phi_{n,n+1} = 0$ for all n, $\alpha = 0$. For a signal with phase noise $\alpha$ will never be zero, and processor 20 must iteratively test values of the $\Delta\phi_{n,n+1}$'s to find the optimal set which minimizes $\alpha$, and use this optimal set to estimate $\omega\Delta t$. Of course, one can use any known search and minimization technique to minimize a, or, more broadly, search for an optimal estimate of $\phi$.

One can apply the invention to any time series so long as phase among series member is maintained. Thus one could use the invention to filter data output directly from sensor 12, or data which has undergone intermediate processing, but in which phase among the series members has been maintained.

After processing, the results may be stored in recording medium 16, or displayed at annunciator 22.

EXAMPLE

An experiment was done to test the effectiveness of $|s|$ as a filter generally, and to compare it to filtering using WISPR alone. The general form of the AWSUM filter is:

$$R_z = \left( \frac{1}{N} \sum_{i=1}^{N} x_i^{-z} \right)^{-\frac{1}{z}}$$

where, again, $x_n$ is the nth of N time samples, and z is an integer greater than 0. WISPR is the special case of AWSUM in which z=1, and WISPR specifically was used, rather than various orders of AWSUM. For convenience the following discussion will drop the subscript 1.

The data were taken in the Pacific ocean, approximately 50-100 miles south of Oahu, Hi. A surface ship towed a line array of 144 hydrophone receivers uniformly spaced at approximately 12.65 m. Two known tonals were radiated from submerged sources. The bottom depth of the oceanic region was between 3000 and 6000 m. The sound speed profile for the region was constructed from expendable bathythermograph measurements taken from the tow ship during the measurement and from historic data. A graph presenting the historic data is shown in the paper by Wagstaff et al., *Phase Variations in a Fluctuation Based Processor*, Hybrid Image and Signal Processing V, SPIE vol. 2751, at p. 134. This article begins at p. 132 of vol. 2751, which itself is the proceedings of a conference held in April, 1996. The article is incorporated herein by reference for all purposes.

From the data taken, 2048 sampling times were selected. For each sensor element, the 2048 time samples received at these 2048 times were processed by a temporal fast Fourier transform (FFT) with Harm weights to generate a complex power spectrum for each sensor. Then, for each frequency bin in each of the 144 spectra, a spatial FFT (again with Harm weights) was performed to generate the steering beams of the array. Because each frequency bin had a complex sample corresponding to each of 144 sensor elements, i.e. one for each sensor element, and an FFT requires a total number of samples which is a power of 2,112 additional synthetic timesamples of zero amplitude and phase were added to each frequency bin to make a total of $2^8 = 256$ samples per bin, yielding 256 beams having corresponding look angles spaced incrementally from 0° to 180°. The result is a complex power spectrum as a function of both acoustic frequency and beam look angle.

Figure 2:
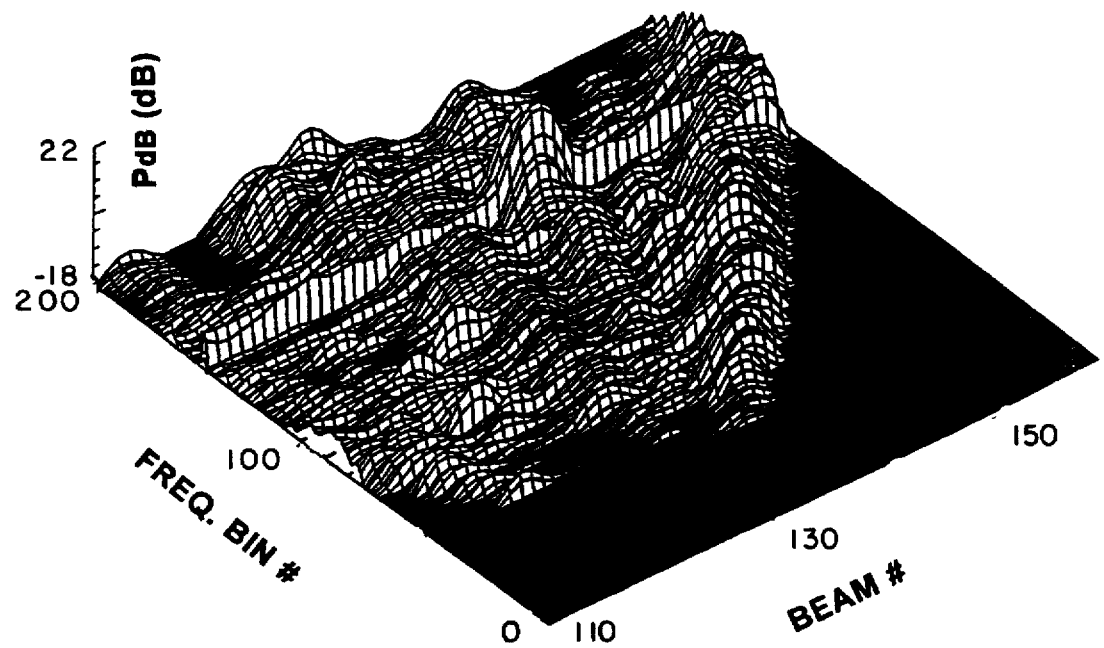
FIGS. 2–6 are graphs of data produced in a test of an embodiment of the invention. In particular.

Thereafter, another 2048 times were selected, the samples taken by the array's elements at these times reduced in the same manner to produce a second frequency-look angle power spectrum, and the process repeated until forty-seven such spectra had been generated. The power values for all forty-seven spectra were averaged point by point, to produce a power averaged spectrum, which is shown in FIG. 2. In FIG. 2, as well as all succeeding figures, power is in decibels (db). The forty-seven spectra were also used to generate, for each point in frequency-beam space, a value of $|s|$ and $|R|$. To do this, the optimal estimate for phase angle $\theta$ for each point in frequency-beam space was determined by minimizing $\alpha = \Sigma_{n=1}^{N-1} Sin^2(\Delta\phi_{n,n+1})$.

Figure 3:
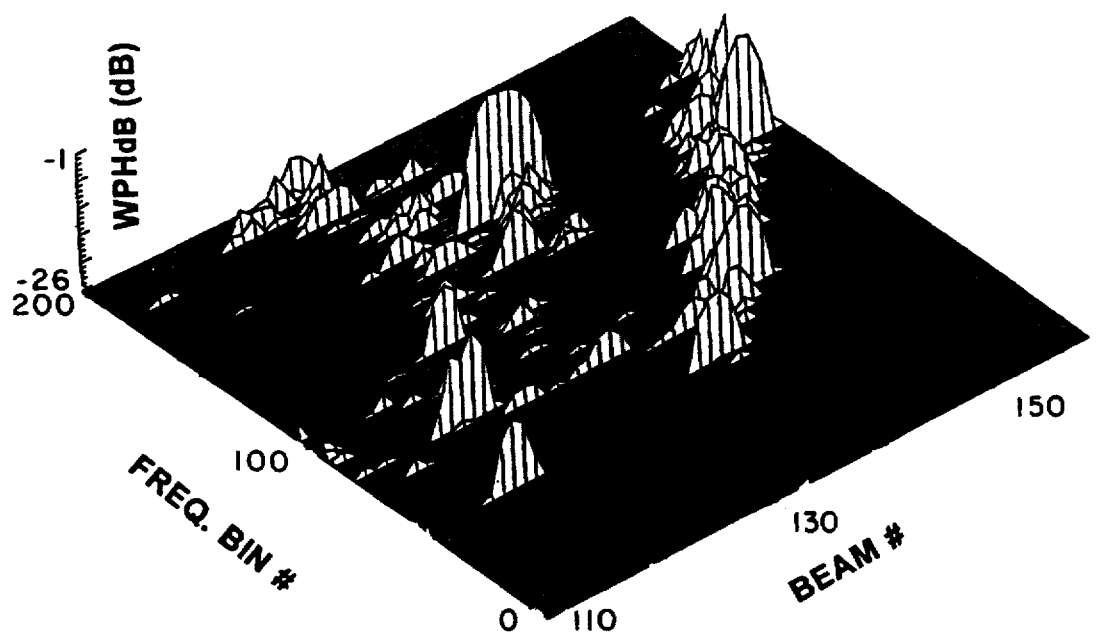
Figure 4:
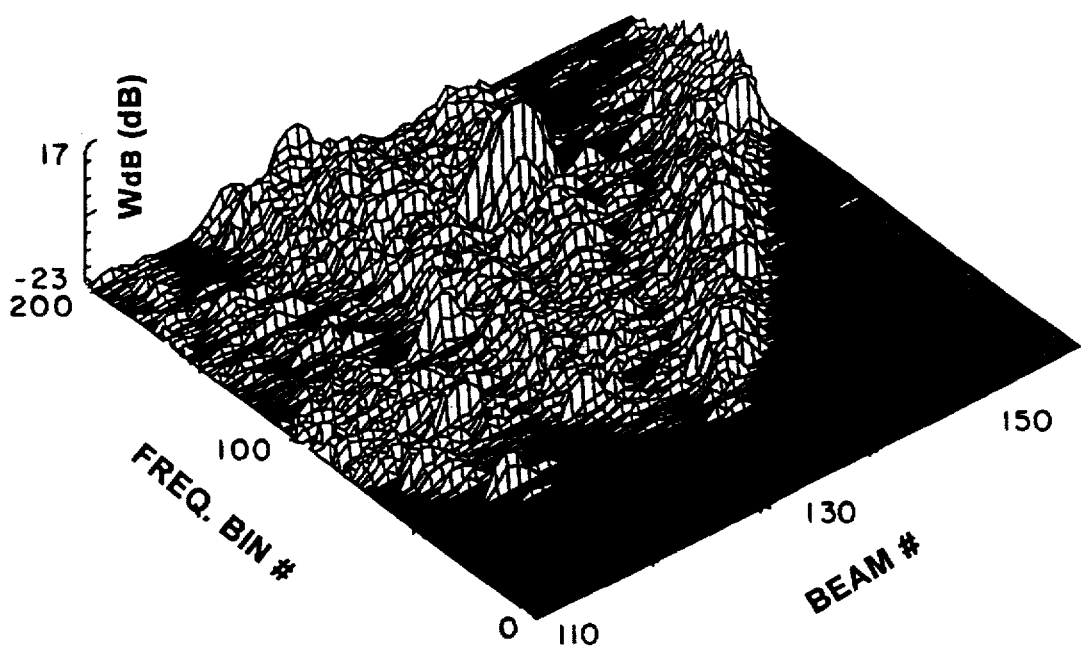
Figure 5:
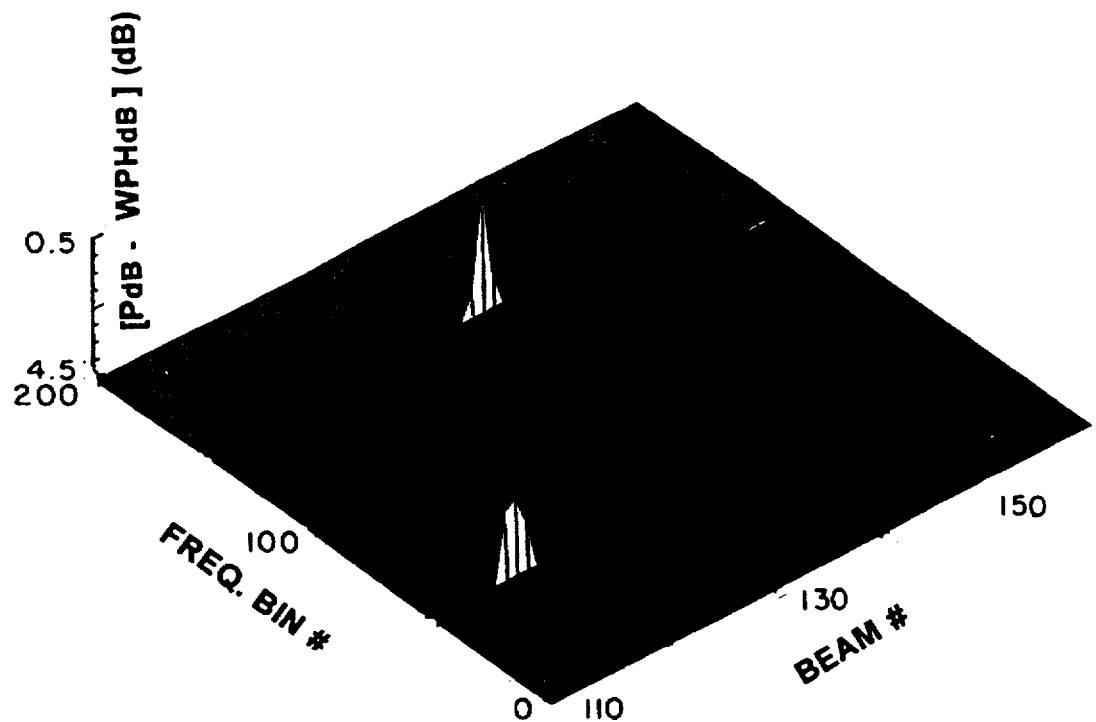
Figure 6:
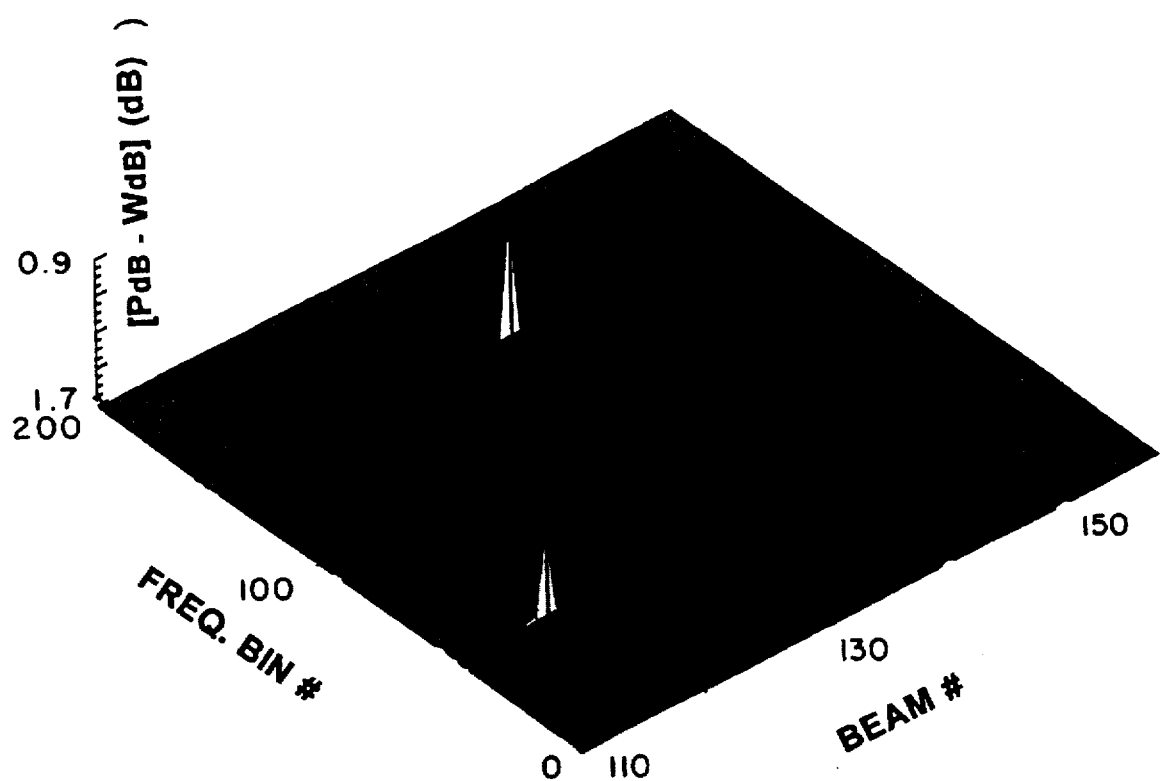

FIG. 3 shows $(|R| |s|')^2$ in units of dB plotted in frequency-beam space, also pointwise averaged over the forty-seven sampling times. FIG. 4 is a plot of $|R|^2$ alone, similarly pointwise averaged. FIG. 5 is a plot of the result of pointwise subtracting the data of FIG. 3 from that of FIG. 2 (average power in dB less $(|R| |s|')^2$ in dB). FIG. 6 is a plot of a pointwise subtraction of the data for FIG. 4 from that of FIG. 2 (average power in dB less $|R|^2$ in dB). Because the data are in decibels, an exponential measure, subtracting from the decibel power levels of FIG. 2 the decibel values of filters $|R|$ or $|s|$ is equivalent to dividing the power levels of FIG. 2 by the filter values. Because both $|R|$ and $|s|$ favor stable signals over fluctuating ones, dividing power values by filter values disproportionately favors points in frequency-beam space whose signals are more unstable, and produce troughs at points containing stable signals. FIGS. 5–6 have descending power decibel scales, i.e. the scales are upside down, so as to make these troughs appear as peaks for easier viewing. Both FIGS. 5 and 6 show two such peaks, at frequency bin 54 and beam number 115, and at frequency bin 154 and beam number 136, respectively. These are the locations of the two submerged tonals. From this one can see that the filter R alone was sufficient to uncover the stable test signals, but a comparison of FIGS. 5 and 6 reveals that the peaks of FIG. 5 are higher than those of FIG. 6, indicating that the WISPR filter with phase information factor $|s|$ produced a better signal to noise ratio than WISPR without phase information, in particular 4.0 dB (4.5–0.5 dB on FIG. 5) compared to 0.8 dB (1.7–0.9 dB on FIG. 6). From this, the value of s as a filter is manifest.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

We claim:

1. A filter for an N point time series sampling of a signal in a physical medium, the nth member of said time series being denoted $x_n$, n=1, 2, ..., N, said filter comprising:

a processor, said processor adapted to determine the phase $\theta_n$ of each said $x_n$;

wherein said processor is further adapted to determine a sum $\bar{s}$ such that:

$$\bar{s} = \Sigma_{n=1}^{N} e^{i\theta_n} = \Sigma_{n=1}^{N-1} [Re(e^{i\theta_n}) + i Im(e^{i\theta_n})].$$

2. The filter of claim 1, wherein said processor is adapted to determine a scalar quantity proportional to $|\bar{s}|$.

3. The filter of claim 1, wherein said time series is in units of power, and said scalar quantity is proportional to $|\bar{s}|$.

4. The filter of claim 2, wherein said scalar quantity is $|\bar{s}|'$, said $|\bar{s}|'=(1/N) |\bar{s}|$.

5. A method of filtering an N point time series sampling of a signal propagating in a physical medium, said time series being denominated $x_1, x_2, \ldots, x_N$, the nth of said time series being denominated $x_n$, $n=1, 2, \ldots, N$, said method comprising:

forming said time series; and forming $\bar{s}\Sigma_{n=1}^{N} e^{i\theta_n} = \Sigma_{n=1}^{N} [\text{Re}(e^{i\theta_n}) + i\text{Im}(e^{i\theta_n})]$ wherein said $\theta_n$ is the phase of each said $x_n$.

6. The method of claim 5, wherein said forming of said $\bar{s}$ is effective to form a scalar quantity proportional to $\bar{s}$.

7. The method of claim 6, wherein said time series is in units of power, and said scalar quantity is proportional to $|\bar{s}|^2$.

8. The method of claim 6, wherein said scalar quantity is $|\bar{s}|'$, wherein $|\bar{s}|'=(1/N) |\bar{s}|$.

9. The method of claim 5, further comprising:

forming $(|R| |\bar{s}|')^2$, where $|R|$ is the scalar magnitude of R, such that:

$$R_z = \left( \frac{1}{N} \sum_{i=1}^{N} x_i^z \right)^{-\frac{1}{z}}$$

and where said z is an integer greater than zero.

10. The filter of claim 1, wherein said processor is further adapted to determine $(|R| |\bar{s}|')^2$, where $|R|$ is the scalar magnitude of R, such that:

$$R_z = \left( \frac{1}{N} \sum_{i=1}^{N} x_i^z \right)^{-\frac{1}{z}}$$

and where said z is an integer greater than zero.

* * * * *